United States Patent [19]

Hirata et al.

[11] Patent Number: 5,242,729
[45] Date of Patent: Sep. 7, 1993

[54] OPTICAL RECORDING MEDIUM

[75] Inventors: Hideki Hirata; Toshifumi Tanaka, both of Miyota; Setsuko Shibuya; Atsuko Motai, both of Saku, all of Japan

[73] Assignee: TDK Corporation, Tokyo, Japan

[21] Appl. No.: 836,677

[22] Filed: Feb. 19, 1992

[30] Foreign Application Priority Data

Feb. 20, 1991 [JP] Japan ................... 3-047817
Feb. 27, 1991 [JP] Japan ................... 3-056181

[51] Int. Cl.$^5$ ............................. B32B 3/00
[52] U.S. Cl. ........................... 428/64; 428/65; 428/212; 428/913; 430/945; 346/76 L; 346/135.1
[58] Field of Search ............ 428/64, 65, 913; 430/945; 346/76 L, 135.1

[56] References Cited

U.S. PATENT DOCUMENTS 5,079,060  1/1992  Toibana et al. ............... 428/64

Primary Examiner—Patrick J. Ryan
Assistant Examiner—Elizabeth Evans
Attorney, Agent, or Firm—Watson, Cole, Grindle & Watson

[57] ABSTRACT

An optical recording disk is constructed using a substrate which is injection molded from a mixture of a cyclic polyolefin and up to 2% by weight of an alkyl phenol condensate. A recording layer remains firmly adhered to the substrate even in a hot humid environment.

13 Claims, 3 Drawing Sheets

OPTICAL RECORDING MEDIUM

This invention relates to optical recording media including magneto-optical and phase change type optical recording media as well as write-once optical recording disks meeting the compact disk standard.

BACKGROUND OF THE INVENTION

Optical recording media of the magneto-optical and phase change types are typically manufactured by depositing various recording layer-forming materials on substrates directly or through an undercoat layer by sputtering or evaporation. The substrates are often formed of resins, typically polymethyl methacrylate and polycarbonate, but these resins are less satisfactory in optical characteristics and water absorption.

JP-A 26024/1985 and 223341/1991 disclose the use of cyclic polyolefin of norbornenes and/or fused nonbornenes, for example, norbornene, tetracyclododecene and the like. It is a useful substrate material because of improved optical characteristics and minimal water absorption.

We have found that cyclic polyolefin substrates are still insufficient in adhesion to a recording layer or an undercoat layer which is applied thereon by a gas phase deposition method. During storage in a high temperature, high humidity environment, the overlying layers (recording or undercoat layers) can separate from the substrates.

Write-once or recordable optical recording disks of the type having recording and reflective layers on a substrate were proposed in accordance with the compact disk (generally known as CD) standard. See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.

This type of disk generally has a dye layer, a reflective Au layer, and a protective layer disposed on a transparent resin substrate in this order. That is, the reflective layer is in close contact with the dye layer. As opposed to the prior art disk of the air sandwich structure wherein an air layer is provided on a dye layer of the disk in order to allow pits to be formed in the dye layer, the newly proposed disk is of the close contact type wherein the reflective layer is close to the dye layer. The close contact type configuration could meet the total disk thickness of 1.2 mm required by the CD standard. As to the substrates of these disks, the same problems as previously mentioned are recognized.

For the purpose of improving the resin flow during injection molding, that is, moldability, it appears effective to add a lubricant to the cyclic polyolefin of formula (I') in our copending application. However, if conventional lubricants such as ester, resin acid, and resinate amide lubricants are added to the cyclic polyolefins, the lubricants evolve gases during molding to introduce unevenness in the molded substrates and it becomes difficult to smoothly apply a dye layer on the substrates.

SUMMARY OF THE INVENTION

A primary object of the invention is to provide an optical recording medium in which the adhesion between the substrate and the recording layer or an undercoat layer, if any, is improved against humidity, ensuring satisfactory recording/reproducing performance.

Another object of the invention is to provide an optical recording medium having a dye-containing recording layer on a substrate in which the dye layer of quality can be smoothly and uniformly applied so that the adhesion between the dye layer and the substrate is enough to provide durability.

For achieving these and other objects, the present invention provides an optical recording medium comprising a recording layer on a substrate. The substrate is formed of a resin composition comprising a cyclic polyolefin having a recurring structural unit of the formula (I) and an effective amount of an alkyl phenol condensate.

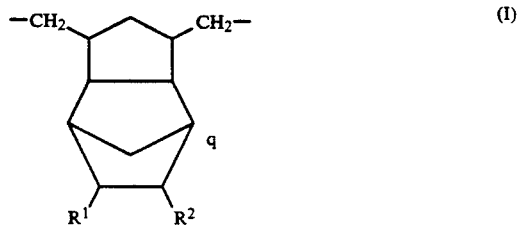

In formula (I), q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring. Preferably, the alkyl phenol condensate is of the formula:

wherein $R^3$ is an alkyl, alkyloxy, or alkylcarbonyl group, A is an aromatic or alicyclic group, L is an alkylenoxy or epoxy group, n is an integer of from 1 to 30, and Y is hydrogen or an alkyl group. Typically the resin composition contains 0.3 to 2% by weight of the alkyl phenol condensate.

Preferably, the substrate includes a skin layer having a thermal softening point of up to about 140° C., especially from about 100° to 140° C. under the surface thereof bearing the recording layer. In addition to the thermal softening point of the skin layer, the substrate has a secondary thermal softening point higher by at least 10° C. than the skin layer thermal softening point. The substrate of such nature is formed by injection molding the resin composition, most often to a disk shape.

The recording layer is formed on the substrate directly or via an undercoat layer. The recording and undercoat layers each are formed by a vapor phase deposition method.

In the embodiment wherein the recording layer contains a dye, the recording layer is formed by dissolving the dye in a ketone solvent and coating the solution to the substrate. Then a reflective layer is applied to the recording layer. Preferably, the substrate is substantially free of another lubricant.

According to the present invention, by adding at least one alkyl phenol condensate to a cyclic polyolefin of formula (I) of which a substrate is formed, the adhesion between the substrate and the overlying layer (recording layer or undercoat layer) is significantly improved so that no separation of the overlying layer can occur even during storage or use in a hot humid environment. This benefit becomes significant when the recording layer is a dye-containing layer. The dye film is improved in applicability to the substrate and quality. Application of a dye-containing recording layer is facilitated and its adhesion to the substrate is firm.

DESCRIPTION OF THE PREFERRED EMBODIMENTS

Figure 1:
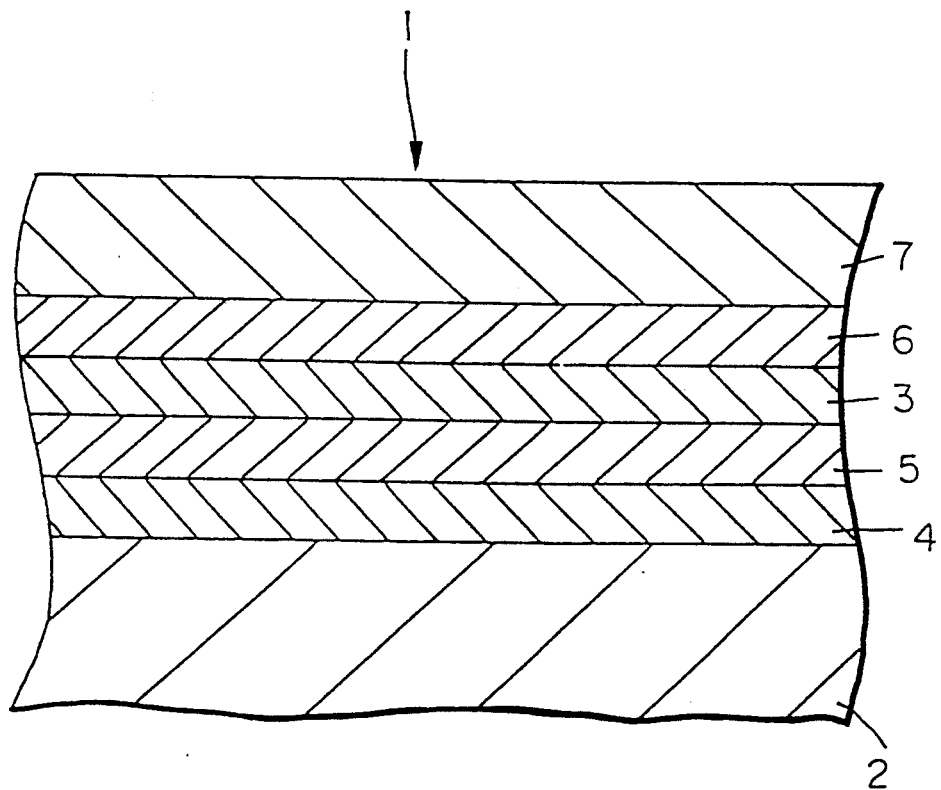
FIG. 1 is a fragmental cross-sectional view of a magneto-optical recording disk according to one preferred embodiment of the invention.

Referring to FIG. 1, there is illustrated in fragmentary cross section an optical recording medium according to one embodiment of the invention. The medium is illustrated as a magneto-optical recording disk 1 having a recording layer 3 on a substrate 2.

The substrate should be substantially transparent to recording and reproducing light, typically semiconductor laser light having a wavelength of about 600 to 900 nm, often about 700 to 800 nm, most often 780 nm. A light transmittance of at least 80% is preferred. This permits recording/reproducing operation from the rear surface of the substrate.

The substrate used in the present invention is formed of a resin composition comprising a cyclic polyolefin and an alkyl phenol condensate. The cyclic polyolefin has a recurring structural unit of formula (I).

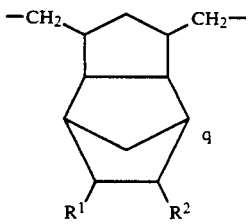
(I)

In the formula, q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring. Preferably $R^1$ and $R^2$ are hydrocarbon groups, more preferably unsubstituted alkyl groups having 1 to 5 carbon atoms.

The cyclic polyolefins used are preferably homopolymers consisting of recurring units of formula (I) although copolymers comprising recurring units of formula (I) wherein q, $R^1$ and $R^2$ are different are acceptable. Also included are copolymers comprising recurring units of formula (I) and other structural units such as ethylene. They preferably have a number average molecular weight of from about 5,000 to 100,000, especially from about 10,000 to 40,000.

In formula (I), the halogen atom, ester group, nitrile group, and heterocyclic group such as pyridyl represented by $R^1$ and $R^2$ are sometimes designated polar groups.

The cyclic polyolefins may be obtained as saturated polymers by polymerizing monomers in accordance with conventional ring-opening techniques, and hydrogenating the resulting open-ring polymers in accordance with conventional techniques. Exemplary monomers include norbornene and alkyl and/or alkylidene substituted ones thereof, for example, 5-methyl-2-norbornene, 5,6-dimethyl-2-norbornene, 5-ethyl-2-norbornene, 5-butyl-2-norbornene, and 5-ethylidene-2-norbornene; dicyclopentadiene, 2,3-dihydrodicyclopentadiene, and alkyl (e.g., methyl, ethyl, propyl, and butyl) substituted ones thereof, and polar group (e.g., halogen) substituted ones thereof; dimethanooctahydronaphthalene and alkyl and/or alkylidene substituted ones thereof, and polar group (e.g., halogen) substituted ones thereof, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and trimers and tetramers of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

These cyclic polyolefins are described in JP-A 223341/1991 and JP-A 26024/1985. Commercially available ones such as Zeonex 280 from Nippon Zeon K.K. may be used.

To the cyclic polyolefin is added at least one alkyl phenol condensate which is preferably of formula (II).

(II)

In formula (II), $R^3$ is a substituted or unsubstituted, linear or branched alkyl, alkyloxy, or alkylcarbonyl group having about 3 to about 30 carbon atoms, with the alkyl groups being preferred. The preferred substituent, if any on these groups, is a hydroxyl group.

A is a substituted or unsubstituted aromatic group such as phenylene and naphthylene groups or a substituted or unsubstituted alicyclic group such as cyclohexylene group, with a p-phenylene group being preferred. The phenylene or naphthylene group represented by A may have attached thereto a substituent such as linear or branched alkyl groups having about 1 to 10 carbon atoms and an additional —O—$L_n$—Y linkage which will be described later.

L is an alkylenoxy group. Preferred alkylenoxy groups are represented by —$R^4$O— wherein $R^4$ is a substituted or unsubstituted, linear or branched alkylene group having 1 to about 5 carbon atoms, especially 1 to 3 carbon atoms. The preferred substituent, if any on these groups, is a hydroxyl group. L is also an epoxy group which may have a lower alkyl substituent. Letter n representing the number of recurring alkylenoxy or epoxy groups is an integer of from 1 to 30, especially from 1 to 20.

Y is hydrogen or a substituted or unsubstituted, linear or branched alkyl group having 1 to about 5 carbon atoms, especially 1 to 3 carbon atoms. Preferred are a hydrogen atom and alkyl groups having a hydroxyl group or a carboxy group or a salt thereof attached thereto. A carbonyl or ether bond may be contained in Y.

Illustrative examples of the alkyl phenol condensate are given below.

| R³ | A | L | n | Y |
|---|---|---|---|---|
| 2,4-dimethylheptyl | p-phenylene | 2-hydroxy-n-propenoxy | 1 | H |
| 2,4-dimethylheptyl | p-phenylene | ethenoxy | 2 | H |
| isooctyl | p-phenylene | ethenoxy | 12 | H |
| isooctyl | o-methyl-p-phenylene | ethenoxy | 10 | H |
| isododecyl | p-phenylene | ethenoxy | 13 | H |
| isohexyl | p-phenylene | ethenoxy | 7 | H |
| oleyl | p-phenylene | ethenoxy | 25 | H |
| lauroyl | p-phenylene | ethenoxy | 16 | H |
| isobutyl | p-phenylene | ethenoxy | 3 | H |
| decyl | p-phenylene | ethenoxy | 30 | H |
| isononyl | p-phenylene | ethenoxy | 8 | H |
| tetradecyl | p-phenylene | ethenoxy | 12 | H |
| triisoheptyl | p-naphthylene | ethenoxy | 25 | H |
| isooctyl | p-phenylene | 1-methylethenoxy | 20 | H |
| isododecyl | p-phenylene | 2-hydroxy-n-propenoxy | 11 | H |
| cyclohexyl | cyclohexylene | 1-methylethenoxy | 3 | H |
| isobutyl | o,m-diisobutyl-p-phenylene | ethenoxy | 5 | H |
| isobutyl | o,m-diisobutyl-p-phenylene | ethenoxy | 6 | H |
| caproyl | p-phenylene | ethenoxy | 3 | carboxymethyl |
| isobutyl | p-phenylene | epoxy | 3 | H |
| isohexyl | p-phenylene | ethenoxy | 7 | H |
| isooctyl | p-phenylene | ethenoxy | 6 | H |
| isododecyl | p-phenylene | ethenoxy | 13 | H |
| oleyl | p-phenylene | ethenoxy | 25 | H |

These alkyl phenol condensates may be obtained in accordance with the conventional method for preparing nonionic surfactants, by condensing a propylene or butylene polymer with phenol and then reacting the condensate with ethylene oxide or the like. Long chain olefins may be used instead of propylene and butylene.

The alkyl phenol condensates used herein preferably have a decomposition temperature of about 250° to 350° C., especially about 290° to 340° C. as measured by a differential scanning calorimeter (DSC). If the decomposition temperature is below the limit, a noticeable amount of gas would evolve during molding or substrates would have a lower glass transition temperature. Condensates having a higher decomposition temperature would be less compatible with the cyclic polyolefin.

In the practice of the invention, substrates are manufactured by injection molding a resin composition. The alkyl phenol condensate is preferably added to resin pellets with which the injection molding machine is charged. In injection molding such resin pellets into a substrate, about 96 to 100% of the alkyl phenol condensate added to the resin pellets is retained in the substrate, enabling substrates to be precisely reproduced to the designed physical properties.

The resin composition of which substrates are formed should contain an effective amount of the alkyl phenol condensate, preferably about 0.01 to about 2% by weight, more preferably about 0.3 to about 2% by weight, most preferably about 0.5 to about 1.5% by weight of the alkyl phenol condensate. The effective amount is an amount of the alkyl phenol condensate that achieves a noticeable improvement in adhesion of cyclic polyolefin base substrates. Higher contents of the alkyl phenol condensate would evolve gases during molding so that some voids might be left in the molded substrate, resulting in a lowering of disk quality.

Under its surface bearing the recording layer, the preferred cyclic polyolefin base substrate includes a skin layer having a thermal softening point of up to about 140° C., especially about 100° to 140° C., more preferably about 100° to 135° C., most preferably about 110° to 135° C. A skin layer having a thermal softening point of higher than 140° C. would adversely affect adhesion whereas a skin layer having a thermal softening point of lower than 100° C. would be low in dimensional accuracy and less resistant against heat encountered during deposition of a recording layer thereon.

For the skin layer forming a surface layer of the cyclic polyolefin base substrate, the thermal softening point is defined as follows. Measurement is made by placing a cylindrical needle having a diameter of about 1 mm in cross section on a substrate to be tested and applying a load of about 5 grams. While heating the substrate from a temperature of about 30° C. at a rate of about 2° C./min., the penetration of the loaded needle is measured.

Figure 2:
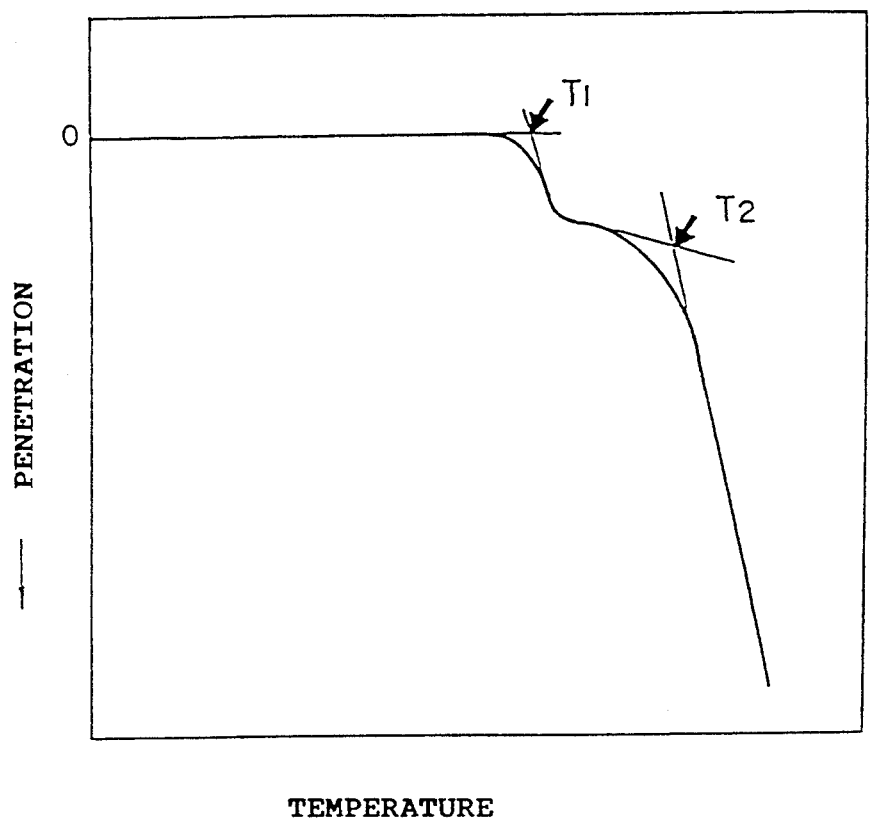
FIG. 2 is a graph plotting the penetration relative to temperature of a cyclic polyolefin base substrate, illustrating the thermal softening points thereof.

FIG. 2 shows the penetration plotted in relation to temperature. In the penetration vs temperature profile of the cyclic polyolefin base substrate, there develop two, first and second, bend points in contrast to the fact that substrates which are cast or injection molded from other resins develop only one bend point (corresponding to the second bend point in FIG. 2) or a faint first bend point, if any, in the penetration vs temperature profile. Such a penetration vs temperature profile is measurable by means of a commercially available thermo-mechanical analyzer (TMA), for example, TMA Model 943 manufactured by E.I. duPont.

The first stage penetration corresponding to the first bend point in FIG. 2 is up to about 200 μm in most samples. It is thus believed that the first bend point is attributable to the softening point of the skin layer or substrate surface layer. In proximity to the first bend point of the penetration vs temperature profile, the thermal softening point of the skin layer is defined as the intersection, designated T1, between a rectilinear trail of the straight section before the onset of needle penetration and a rectilinear extension of the first stage penetration. As previously defined, primary softening point T1 is limited up to about 140° C., especially from about 100° to 140° C.

In proximity to the second bend point of the penetration vs temperature profile, the secondary thermal softening point of the substrate is defined as the intersection, designated T2, between a rectilinear extension of the transition from the first to second stage penetration and a rectilinear extension of the second stage penetration. It is believed that the secondary thermal softening point T2 is the thermal softening point of the substrate at its interior. Preferably, the secondary thermal softening point T2 is higher than the secondary thermal softening point T1 by at least 10° C., more preferably by 10° to 50° C. Typically, T2 is at least 140° C., especially from about 145° to 180° C. because improvements in dimensional accuracy, mechanical properties, and heat resistance are expectable.

It is to be noted that the skin layer is observable as a layer of different color from the underlying area in a SEM image of a cross section of the substrate transverse to its surface. The thickness of the skin layer generally ranges from about 1 to 200 μm, especially from about 10 to 100 μm.

Such a skin layer can be established by various means, preferably by injection molding the cyclic polyolefin base composition. When the composition is cast, for example, it has only the secondary thermal softening point T2, i.e., ordinary softening point. To establish a skin layer by injection molding the cyclic polyolefin base composition, molding parameters should be properly selected. Preferred molding parameters include an injection pressure of about 250 to 400 kg/cm$^2$, a melt temperature of about 300° to 400° C., and a mold temperature of about 90° to 120° C. while the remaining parameters like dwell pressure and mold clamping force may be as usual.

If desired, the substrate may be formed with an oxygen-impermeable coating on its outer surface and outer periphery surface. Further, the substrate on the recording layer-bearing surface may be provided with tracking grooves.

No limit is imposed on the dimensions of the substrate. In the CD application, for example, substrates may have a diameter of about 80 to 120 mm and a thickness of about 1.2 mm. The exact dimensions of the substrate vary with a particular application.

Referring to FIG. 1 again, the magneto-optical recording disk 1 includes a protective layer 4 and an intermediate layer 5 as an undercoat layer on the substrate 2, the recording layer 3, a protective layer 6, and a protective coat 7 stacked on the substrate in the described order.

The intermediate layer 5 is provided for improving C/N ratio and may be formed of any dielectric material to a thickness of about 30 to 150 nm.

The protective layers 4 and 6, when both are formed, may be of an identical or different composition. Since these protective layers 4 and 6 serve to improve corrosion resistance, at least one of them should preferably be provided, most preferably both. The protective layers 4 and 6 are preferably inorganic thin films of an oxide, carbide, nitride, sulfide or a mixture thereof. Alternatively, they may be formed of the same type of material as the intermediate layer. They have a thickness of about 30 to 300 nm for corrosion resistance enhancement.

The protective layers 4 and 6 and intermediate layer 5 may be formed by any gas phase deposition method, for example, sputtering, evaporation, and ion plating, with sputtering being preferred.

In this embodiment, the recording layer 3 is a layer in which information is magnetically recorded by means of a modulated thermal beam or a modulated magnetic field and the recorded information is reproduced through magneto-optical conversion.

Any material capable of magneto-optical recording is useful as the recording layer 3. Preferably, an alloy containing a rare earth metal, more preferably a rare earth metal and a transition metal is sputtered, evaporated or ion platted to form an amorphous film, with sputtering recommended. The rare earth metals used herein include Tb, Dy, Nd, Gd, Sm, and Ce, and mixtures thereof. The transition metals include Fe and Co. Preferably the alloy consists essentially of Fe and Co in a total content of 65 to 85 atom % and the balance of a rare earth metal or metals. The preferred recording layer has a composition: TbFeCo, DyTbFeCo, NdDyFeCo, NdGdFeCo, and the like. The recording layer may contain up to 10 atom % of an additional metal or metals selected from Cr, Al, Ti, Pt, Si, Mo, Mn, V, Ni, Cu, Zn, Ge, and Au. Also, the recording layer may contain up to 10 atom % of another rare earth metal or metals selected from Sc, Y, La, Ce, Pr, Pm, Sm, Eu, Ho, Er, Tm, Yb, and Lu.

The recording layer 3 generally has a thickness of about 10 to about 1,000 nm.

Even when the recording layer 3 and intermediate layer 5 as the undercoat layer are formed on the substrate 2 by a gas phase deposition method, typically sputtering, the substrate of alkyl phenol condensate-containing cyclic polyolefin, especially its skin layer is effective in preventing separation of the overlying layers therefrom.

The protective coat 7 is preferably provided on the second protective layer 6 for the purpose of improving corrosion resistance and mar resistance. It may be formed from various resinous materials, typically UV-curable resins to a thickness of about 0.1 to 100 μm. Although the protective coat 7 may be a deposited layer or a preformed sheet, it is preferably formed by coating a composition of a radiation-curable compound and a photopolymerization sensitizer and curing the coating with radiation.

Also, the present invention is applicable to optical recording disks having a recording layer of the phase change type which utilizes a change of reflectivity for recording and reproducing operation. The recording layer of this type includes Te-Se base alloys as disclosed in Japanese Patent Publication (JP-B) No. 41902/1979 and Japanese Patent No. 1004835, Te-Ge base alloys as disclosed in Japanese Patent Application Kokai (JP-A) No. 76035/1987, Te-In base alloys as disclosed in JP-A 56827/1988, Te-Sn base alloys as disclosed in Japanese Patent Application Nos. 307298/1986 and 307299/1986, Te oxides as disclosed in JP-A 54338/1983 and Japanese Patent Nos. 974257 and 974258, and other Te and Se base chalcogenides; alloys capable of amorphous-crystalline transition such as Ge-Sn and Si-Sn; and alloys capable of producing a color change through a crystal structure change such as Ag-Zn, Ag-Al-Cu, and Cu-Al and alloys capable of producing a grain size change such as In-Sb.

Below these recording layers, an undercoat layer or protective layer may also be formed by a gas phase deposition method.

The embodiments of the present invention wherein the recording layer and the undercoat layer, if any, are formed by a gas phase deposition method, typically sputtering are adapted for both phase change type optical recording disks having a metal recording layer and magneto-optical recording disks having a recording layer containing a rare earth metal element.

Next, another embodiment of the invention in which the recording layer is a dye film is described.

Figure 3:
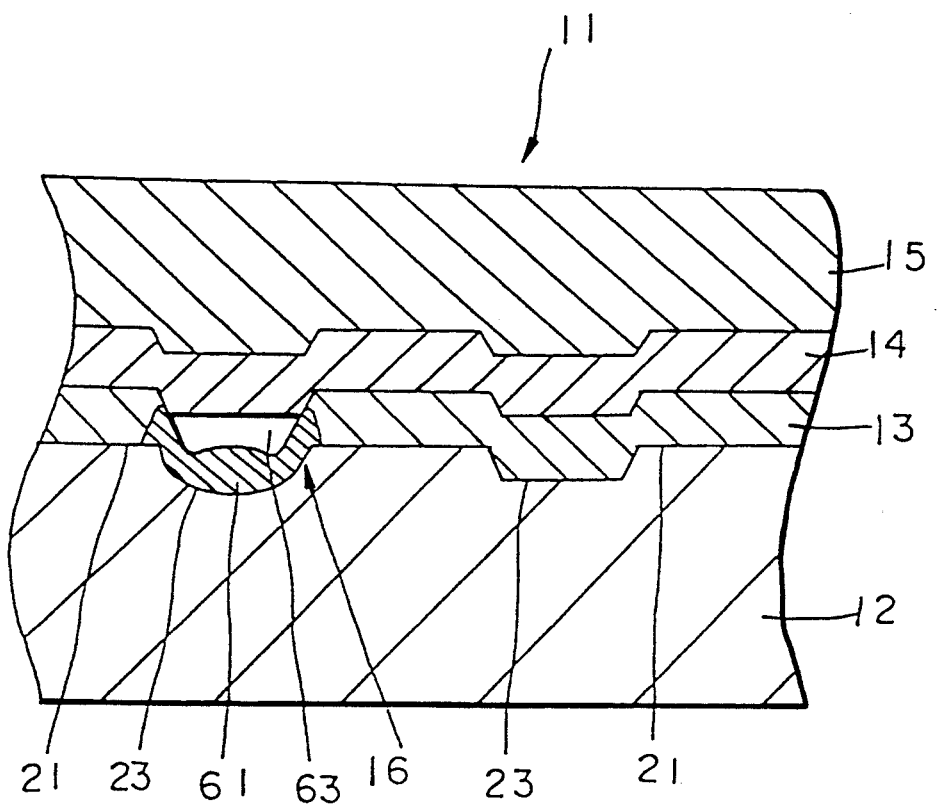
FIG. 3 is a fragmental cross-sectional view of an optical recording disk having a dye-containing recording layer according to another embodiment of the invention.

Referring to FIG. 3, there is illustrated an optical recording disk 11 of the close contact type including a substrate 12, a recording layer 13 containing a dye, a reflective layer 14, and a protective layer 15.

The substrate is formed of a resin composition comprising a cyclic polyolefin and an alkyl phenol condensate, all as defined above.

As previously mentioned, the resin composition of which substrates are formed should preferably contain a cyclic polyolefin and about 0.01 to about 2% by weight, more preferably about 0.3 to about 2% by weight, most preferably about 0.5 to about 1.5% by weight of at least one alkyl phenol condensate. Higher contents of the alkyl phenol condensate would evolve gases during molding so that some voids might be left in the molded substrate, resulting in reduced disk quality. Higher contents also adversely affect the receptivity of substrates to dye films. From the aspect of dye film application, the alkyl phenol condensate content should be up to about 2% by weight and preferably as low as possible. From the aspect of dye film adhesion to substrates, the alkyl phenol condensate content should preferably be about 0.3% by weight or higher because the recording layer can otherwise separate after long-term storage in a hot humid environment particularly when a reflective layer is overlaid.

When about 0.3 to about 2% by weight, especially about 0.5 to about 1.5% by weight of the alkyl phenol condensate is added to the cyclic polyolefin, the condensate can best function as a lubricant for improving injection molding capability and the resin flow during molding.

Preferably, the resin composition should be substantially free of a lubricant other than the alkyl phenol condensate. Deleterious lubricants to be excluded from the present composition include ester lubricants such as glycerin monoesters, glycerin diesters, palmitates, and ethylene glycol monoesters; resin acid lubricants such as stearic acid, behenic acid, and arachidic acid; and resinate amide lubricants such as erucic acid amide and eicosenoic acid amide. Inclusion of such lubricants is not only deleterious to the application of dye films, but little improves moldability.

It is acceptable that the resin composition contain other additives such as stabilizers, anti-oxidants, and UV-absorbers.

In the dye-containing recording layer embodiment, the substrate is often provided with tracking grooves 23 as shown in FIG. 3.

More particularly, on the surface of the substrate 12 where the recording layer 13 is formed, the upper surface in the illustrated embodiment, a groove 23 is formed for tracking purposes. The tracking groove 23 preferably consists of continuous spiral turns. Typically, the groove 23 has a depth of 250 to 1800 Å and a width of 0.2 to 1.1 μm, preferably 0.3 to 0.6 μm (width in a radial direction with respect to the disk center). The adjoining turns 23 are separated by a land 21 having a width of 0.5 to 1.4 μm, preferably 1.0 to 1.3 μm. With this groove configuration, tracking signals can be obtained without reducing the reflection level of the groove. The groove may be provided with recesses or projections for addressing signals.

Where the groove is formed in the surface of the substrate, a provision is preferably made such that recording light is directed to a recording layer within the groove. That is, the optical recording medium of the invention is preferably of the groove recording mode. The groove recording mode allows the recording layer to have an increased effective thickness.

The recording layer 13 is formed on the grooved substrate 12 using a light absorbing dye or a mixture of compatible dyes. A light absorbing dye may be mixed with a quencher. Also a photo-stabilized dye, that is, an ionic combination or ionically bonded compound of a dye cation and a quencher anion is a useful light absorbing dye.

Preferably, the recording layer 13 has a coefficient of extinction (the imaginary part of a complex index of refraction) k of from 0.03 to 0.25 at the wavelength of recording and reproducing light. With a coefficient of extinction k of less than 0.03, the recording layer can have a lower absorptivity so that it might become difficult to record with a commonly used power. A coefficient of extinction k of more than 0.25 can result in a drop of reflectivity to below 60%, often failing to reproduce according to the CD standard.

The recording layer preferably has an index of refraction (the real part of a complex index of refraction) n of from 1.8 to 4.0, more preferably 2.2 to 3.3 at the wavelength of recording and reproducing light. With $n<1.8$, the refelectivity and reproduced signal therewith would be reduced, often failing to reproduce according to the CD standard. Few dyes have $n>4.0$.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168-178.

The light absorbing dyes used herein preferably have maximum absorption at a wavelength in the range of from 600 to 900 nm, more preferably from 600 to 800 nm, most preferably from 650 to 750 nm. Such a light absorbing dye is preferably selected from the group consisting of cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. Preferred are the cyanine dyes, typically cyanine dyes having an indolenine ring, especially a benzoindolenine ring.

In the practice of the invention, the recording layer 13 is often formed by coating a solution of the dye in a suitable solvent. The solvents used in dye coating include ketone, ester, ether, aromatic, halogenated alkyl and alcohol solvents. Preferred are ketone solvents such as cyclohexanone, methyl ethyl ketone, and methyl isobutyl ketone. Ketone solvents have many advantages including increased solubility of dyes therein, improved quality of the resulting dye film, ease of application, and inertness that they do not chemically attack the substrate surface, all contributing to substantial improvements in quality of the optical recording medium.

The recording layer 13 preferably has a thickness of about 500 to about 2,000 Å. The recording layer 13 is generally thicker in the grooves 23 than on the lands 21 therebetween. Outside the range, the reflectivity would become too low to provide reproduction in accordance with the CD standard.

To the recording layer 13, the reflective layer 14 may be applied in direct contact therewith. It may be formed of any high reflectivity metal such as Au, Ag and Cu or an alloy thereof by evaporation or sputtering. The reflective layer 14 preferably has a thickness of at least about 500 Å. Although no upper limit is generally imposed on the thickness of the reflective layer, a thickness of up to about 1,200 Å is preferred in view of manufacturing cost and time. The reflective layer alone has a reflectivity of at least 90%, so that the reflectivity of an unrecorded portion of the medium through the substrate can be at least 60%, especially at least 70%.

The protective layer 15 may be formed on the reflective layer 14. The protective layer may be of any desired resin material such as a UV-curable resin, and usually about 0.1 to about 100 $\mu$m thick. It may be either a layer or a sheet, but is preferably prepared by coating a composition of a radiation-curable compound and a photopolymerization sensitizer and curing the coating with radiation.

Preferably, the protective layer has a hardness in the range of H to 8 H, especially 2 H to 7 H in pencil hardness at 25° C. according to JIS K-5400. This hardness range leads to an improved eye pattern and a substantial reduction of jitter. In addition, the protective layer will not separate from the underlying reflective layer during shelf storage under hot humid conditions or varying temperature and humidity conditions. More specifically, the eye pattern can be disturbed and the jitter can increase if the protective layer is softer than pencil hardness H. A protective layer harder than 8 H becomes brittle and difficult to form or would not fully adhere to the underlying reflective layer.

The radiation curable compounds used in forming the protective layer include oligoester acrylates. The oligoester acrylates are oligoester compounds having at least two acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups. In addition to or instead of the oligoester acrylates, there may be used radiation-curable compounds in the form of thermoplastic resins modified to be radiation sensitive.

The protective layer of such a radiation-curable compound preferably has a thickness of from about 0.1 to 30 $\mu$m, more preferably from about 1 to 10 $\mu$m. A protective layer of thinner than 0.1 $\mu$m is often difficult to form uniformly and insufficient as a moisture barrier in a humid atmosphere so that the underlying recording layer becomes less durable. Jitter prevention also becomes insufficient. A protective layer thicker than 30 $\mu$m tends to invite distortion of the overall recording medium and cracking of the protective layer itself due to shrinkage upon curing.

The protective layer may be formed by any desired well-known technique, for example, spin coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred. For UV curing, a photopolymerization sensitizer is generally added to the radiation-curable compounds. Any well-known photopolymerization sensitizer may be used, for example, benzoins such as benzoin methyl ether, benzoin ethyl ether, $\alpha$-methylbenzoin, and $\alpha$-chlorodeoxybenzoin, ketones such as benzophenone, acetophenone, and bis-dialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known method. For example, UV lamps such as xenon discharge lamps and mercury discharge lamps are used. If desired, electron radiation may be used.

Recording or additional recording may be carried out on the optical recording medium 11 of the above-described construction by directing recording light having a wavelength of 780 nm, for example, in pulse form to the recording layer 13 in the groove 23 through the substrate 12 to form a pit 16. The recording layer 13 absorbs light so that it is heated while the substrate 12 is heated at the same time. As a result, the recording material, typically dye melts or decomposes near the interface between the substrate 12 and the recording layer 13, applying a pressure to the interface between the substrate 12 and the recording layer 13 to deform the bottom and side walls of the groove 23.

The melted or decomposed products of the recording material leave a mass 61 on the bottom of the groove 23. Since the decomposed mass 61 somewhat invades the substrate where the skin layer having a certain thermal softening point covers, the pit 16 becomes convex toward the substrate and larger in dimensions than the geometry of the recording layer originally confined in the groove 23. The depression of the substrate is generally up to about 300 Å deep although it depends on the size of the pit 16 formed.

The decomposed mass 61 consists essentially of the decomposed product of the recording material or a mixture of the decomposed product of the recording material and the recording material, but does not substantially contain the substrate material. The decomposed mass 61 generally occupies about 30 to 100% of the original thickness of the recording layer 13 in the groove 23. Often, a space 63 is left above the decomposed mass 61 and below the reflective layer 14. In this regard, the decomposed mass 61 and space 63 form the pit 16. The space generally occupies about 5 to 70% of the original thickness of the recording layer 13.

It was empirically found that pits of well defined outer contour and contricted U shape were formed. The presence of the skin layer contributed to enlargement and configuration of pits and thus to C/N and sensitivity improvements.

It is to be noted that the recording light has a power of about 5 to 9 mW while the substrate is rotated at a linear velocity of about 1.2 to 1.4 m/sec.

After the recorded sites or pits 16 are formed in this way, reproducing light having a wavelength of 780 nm and a power of about 0.1 to 2 mW is directed to the pits 16 through the substrate 12. The pits cause a phase difference to reduce the reflectivity to not greater than 60%, preferably not greater than 50%, more preferably not greater than 40% of the reflectivity of unrecorded portions. In turn, the remaining recording layer, that is, the unrecorded portions maintain a high reflectivity of at least 60%, especially at least 70%. This differential reflectivity enables reproduction according to the CD standard.

Although an optical disk has been described as a typical embodiment of the optical recording medium of the present invention, the present invention is also applicable to optical recording disks of the air sandwich structure having a recording layer is internally sealed through an air space or recording layers are opposed through an air space rather than laying a reflective layer over the recording layer wherein pit formation results in a change of reflectivity.

EXAMPLE

Examples of the present invention are given below by way of illustration and not by way of limitation.

EXAMPLE 1

There were prepared pellets of Zeonex 280 as a cyclic polyolefin having recurring units of formula (I) and a number average molecular weight of 29,000. To the cyclic polyolefin pellets was added a varying amount of a mixture of two alkyl phenol condensates of the following formulae (II-1) and (II-2) in a weight ratio of 3.2:1. The amounts of the condensate mixture added varied from 0 to 2.3% by weight of the total composition as reported in Table 1.

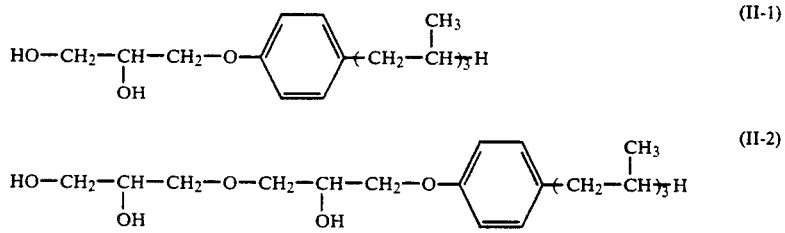

The pellets were melted at 350° C. and injection molded into substrates having a diameter of 120 mm and a thickness of 1.2 mm at a mold temperature of 100° C. under an injection pressure of 350 kg/cm². There were obtained substrate sample Nos. 1 to 4. Gas void traces were observed in substrate sample No. 4 which contained 2.3% by weight of the alkyl phenol condensate. The substrates were measured for thermal softening point by means of a TMA under the conditions: a cylindrical needle having a diameter of 1 mm in cross section, an applied load of 5 grams, and a heating rate of 2° C./min. A profile representing the penetration of the loaded needle with rising temperature was measured, and primary and secondary thermal softening points T1 and T2 were calculated therefrom. Table 1 reports T1 and T2 of the substrates. A SEM image of the substrates also indicated the presence of a skin layer having a thickness of up to about 100 μm.

On each substrate, a protective layer of glass was deposited by RF magnetron sputtering to a thickness of 40 nm. On the protective layer, an intermediate layer of SiNx was deposited by RF magnetron sputtering to a thickness of 80 nm. On the intermediate layer, a recording layer of Tb23Fe72Co5 was deposited by sputtering to a thickness of 80 nm. On the recording layer, another protective layer of the same composition as the first one was deposited by RF magnetron sputtering to a thickness of 100 nm. On the protective layer, a protective coat was formed by applying a UV curable resin containing an oligoester acrylate followed by UV curing to a thickness of 5 μm. There were completed optical recording disks designated sample Nos. 1 to 4.

Sample Nos. 1 to 4 were subjected to a corrosion test. The samples were allowed to stand at a temperature of 80° C. and a relative humidity of 85% for 2,500 hours before the interface between the substrate and the overlying layers was visually observed with naked eyes and under an optical microscope. The samples were evaluated excellent (OO) when they remained intact, good (O) when a few minor blisters of about 10 to 100 μm developed, fair (Δ) when blisters developed locally, but apparently, and poor (X) when blisters developed over the entire surface and separation occurred at the interface.

The results are shown in Table 1.

TABLE 1

| Sample No. | Alkyl phenol condensate content (wt %) | Thermal softening point (°C.) | | Storage stability |
|---|---|---|---|---|
| | | T1 | T2 | |
| 1 | 0 | 134 | 165 | X |
| 2 | 0.8 | 129 | 160 | OO |
| 3 | 1.2 | 124 | 156 | OO |
| 4 | 2.3 | 120 | 153 | — |
| 5 | 0 | 143 | 168 | X |
| 6 | 1.2 | 142 | 165 | Δ |

EXAMPLE 2

The pellets of sample Nos. 1 and 3 containing 0 and 1.2% by weight of the alkyl phenol condensate mixture were injection molded as in Example 1 except that the molding conditions were changed to a melt temperature of 330° C., a mold temperature of 80° C. and an injection pressure of 370 kg/cm². There were obtained substrate samples, designated Nos. 5 and 6, with a skin layer having a thermal softening point T1 in excess of 140° C.

Disk samples were prepared from these substrates by the same procedure as in Example 1. The results are shown in Table 1.

EXAMPLE 3

There were prepared substrate sample Nos. 11-16. Substrate sample Nos. 11-14 and 16 are the same as substrate sample Nos. 1-4 of Example 1 and No. 6 of Example 2. More particularly, substrate sample Nos.

11-14 consisted of the cyclic polyolefin and 0, 0.8, 1.2, and 2.3% by weight of the alkyl phenol condensate, respectively. Sample No. 16 had the same alkyl phenol content (1.2%) as sample No. 13, but a skin layer softening point T1 in excess of 140° C. as a result of injection molding under different conditions.

Comparative substrate sample No. 15 was prepared by adding 1.25% by weight of a mixture of glycerin monoester and glycerin diester to the cyclic polyolefin pellets as a lubricant instead of the alkyl phenol condensate mixture. Molding conditions were the same as sample No. 13.

On each substrate having grooves separated by lands was formed a recording layer containing dyes A1 and A2 shown below.

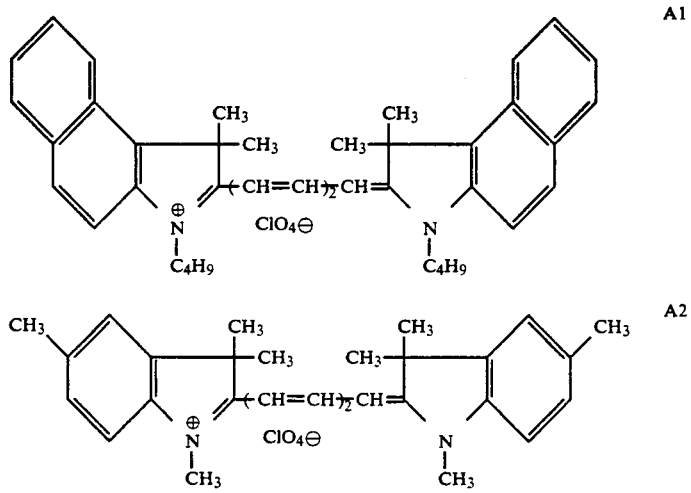

The dyes were dissolved in cyclohexanone to form a 3.5 wt % solution. While the substrate was rotated at 500 rpm, the dye solution was applied to the substrate by spin coating. After drying, the dye layer had a thickness of 1400 Å in grooves and 900 Å on lands.

The recording layer contained 60% by weight of dye A1, 30% by weight of dye A2, and 10% by weight of a singlet oxygen quencher. The recording layer had an index of refraction (n) of 2.6 and a coefficient of extinction (k) of 0.06. The index of refraction (n) and coefficient of extinction (k) of the recording layer were determined by applying a solution of dyes onto a test substrate to a dry thickness of 1,000 Å and measuring the n and k of the resulting recording layer. The measurement was made according to K. Ishiguro, "Optics," Kyoritsu Publishing K. K., pages 168–178.

Coating of the dye solution was acceptable on sample Nos. 11–13 and 16 whereas no films could be formed on sample Nos. 14 and 15.

On the recording layer, an Au film of 1,000 Å thick was formed as a reflective layer by sputtering. A protective film was formed thereon by spin coating a coating composition containing a radiation-curable compound and a photopolymerization sensitizer. That is, the coating composition contained 100 parts by weight of a polyfunctional oligoester acrylate consisting of 30% by weight of trifunctional or more oligoester acrylate and 70% by weight of trimethylpropane acrylate available as Aronix M-8030 from Toa Synthesis K.K. and 5 parts by weight of a photopolymerization sensitizer available as IRGACURE 907 from Japan Ciba Geigy K.K. The coating was exposed to UV radiation at 120 W/cm for 15 seconds, thereby crosslinking and curing the coating into a cured film having a pencil hardness of 2 H and a thickness of 5 μm.

In this way, optical recording disk samples designated Nos. 11–13 and 16 were obtained.

The disk samples were measured for sensitivity.

EFM modulation signals were recorded as CD signals in the disk, and an eye pattern of reproduced HF signals was obtained. The recording sensitivity is the recording power (expressed in mW) at which assymmetry is −5% in the eye pattern. The results are shown in Table 2.

Separately, sample Nos. 11–13 and 16 were subjected to a corrosion test. The samples were allowed to stand at a temperature of 80° C. and a relative humidity of 85% for 2,500 hours before the interface between the substrate and the overlying layers was visually observed with naked eyes and under an optical microscope. The samples were evaluated excellent (OO) when they remained intact, good (O) when a few minor blisters of about 10 to 100 μm developed, fair (Δ) when blisters developed locally, but apparently, and poor (X) when blisters developed over the entire surface and separation occurred at the interface.

The results are shown in Table 2.

TABLE 2

| Sample No. | Alkyl phenol condensate content (wt %) | Thermal softening point (°C.) T1 | Thermal softening point (°C.) T2 | Sensitivity (mW) | Storage stability |
| --- | --- | --- | --- | --- | --- |
| 11 | 0 | 134 | 165 | 6.3 | Δ |
| 12 | 0.8 | 129 | 160 | 5.9 | OO |
| 13 | 1.2 | 124 | 156 | 5.6 | OO |
| 14 | 2.3 | 120 | 153 | — | — |
| 15 | 1.2* | 132 | 163 | — | — |
| 16 | 1.2 | 142 | 165 | 7.8 | Δ |

*comparative lubricant

BENEFITS OF THE INVENTION

There has been described an optical recording medium having a recording layer on a modified cyclic polyolefin base substrate in which the recording layer remains firmly adhered to the substrate even during storage in a hot humid environment.

When it is desired to provide a recording layer containing a dye, the substrate allows a dye film of quality to be readily formed thereon to a sufficient degree of adhesion to improve durability, humidity resistance, and shelf stability.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. An optical recording medium comprising a recording layer on a substrate, the substrate being formed of a resin composition comprising a cyclic polyolefin having a recurring structural unit of the formula:

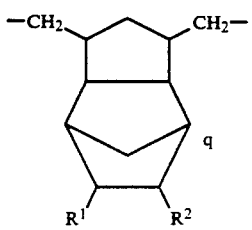 (I)

wherein q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring, and an amount of up to 2% by weight of an alkyl phenol condensate.

2. The optical recording medium of claim 1 wherein said alkyl phenol condensate has a structure represented by the formula:

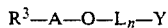 (II)

wherein
$R^3$ is alkyl, alkyloxy, or alkylcarbonyl group,
A is an aromatic or alicyclic group,
L is an alkylenoxy or epoxy group,
n is an integer of from 1 to 30, and
Y is hydrogen or an alkyl group.

3. The optical recording medium of claim 1 wherein said resin composition contains 0.3 to 2% by weight of the alkyl phenol condensate.

4. The optical recording medium of claim 1 wherein said substrate includes a skin layer having a thermal softening point of up to about 140° C. under the surface thereof bearing the recording layer.

5. The optical recording medium of claim 4 wherein said substrate is a disk-shaped substrate formed by injection molding said resin composition.

6. The optical recording medium of claim 4 wherein said skin layer has a thermal softening point of about 100° to 140° C.

7. The optical recording medium of claim 4 wherein said substrate has the thermal softening point of the skin layer and a secondary thermal softening point higher by at least 10° C. than the skin layer thermal softening point.

8. The optical recording medium of claim 1 wherein said recording layer is formed directly on said substrate by a vapor phase deposition method.

9. The optical recording medium of claim 1 which further includes an undercoat layer between said substrate and said recording layer, wherein said recording and undercoat layers each are formed by a vapor phase deposition method.

10. The optical recording medium of claim 1 wherein said recording layer contains a dye.

11. The optical recording medium of claim 10 wherein said substrate is substantially free of another lubricant.

12. The optical recording medium of claim 10 wherein said recording layer is formed by dissolving the dye in a ketone solvent and coating the solution to the substrate.

13. The optical recording medium of claim 10 which further includes a reflective layer on the recording layer.

* * * * *

UNITED STATES PATENT AND TRADEMARK OFFICE
CERTIFICATE OF CORRECTION

PATENT NO. : 5,242,729
DATED : September 7, 1993
INVENTOR(S) : Hideki HIRATA, Toshifumi TANAKA and Atsuko MOTAI It is certified that error appears in the above-indentified patent and that said Letters Patent is hereby corrected as shown below:

Column 17, (claim 1) lines 11-33, should read as follows:

1. An optical recording medium comprising a recording layer on a substrate, the substrate being formed of a resin composition comprising a cyclic polyolefin having a recurring structural unit of the formula:

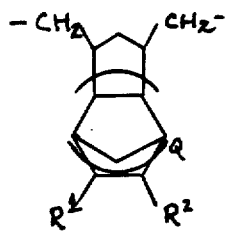

wherein q is equal to 0 or a positive integer, $R^1$ and $R^2$ are independently selected from the group consisting of a hydrogen atom, halogen atom, hydrocarbon group, ester group, nitrile group, and heterocyclic group, and $R^1$ and $R^2$, taken together, may form a ring, and an amount of up to 2% by weight of an alkyl phenol condensate.

Signed and Sealed this

Fifth Day of April, 1994

Attest:

BRUCE LEHMAN

*Attesting Officer*     *Commissioner of Patents and Trademarks*